(12) United States Patent
Wang (10) Patent No.: US 7,712,895 B2
(45) Date of Patent: May 11, 2010

(54) EYEGLASSES STRUCTURE

(76) Inventor: Chih-Hung Wang, No. 75, Cing-An Rd., Sigang Township, Tainan County (TW)

( * ) Notice: Subject to any disclaimer, the term of this patent is extended or adjusted under 35 U.S.C. 154(b) by 0 days.

(21) Appl. No.: 12/010,770

(22) Filed: Jan. 30, 2008

(65) Prior Publication Data

US 2009/0190089 A1  Jul. 30, 2009

(51) Int. Cl.
*G02C 1/04* (2006.01)
(52) U.S. Cl. ...................... 351/106; 351/154
(58) Field of Classification Search .............. 351/41, 351/44, 103–109, 154
See application file for complete search history.

(56) References Cited

U.S. PATENT DOCUMENTS

| | | | | |
|---|---|---|---|---|
| 4,371,238 A | * | 2/1983 | Lhospice | 351/106 |
| 5,467,148 A | * | 11/1995 | Conway | 351/85 |
| 5,956,115 A | * | 9/1999 | Bolle | 351/62 |
| 2007/0252942 A1 | * | 11/2007 | Collier et al. | 351/41 |
| 2008/0304005 A1 | * | 12/2008 | DiChiara | 351/106 |
| 2009/0257019 A1 | * | 10/2009 | Dichiara | 351/106 |

* cited by examiner

*Primary Examiner*—Huy K Mai
(74) *Attorney, Agent, or Firm*—Rosenberg, Klein & Lee (57) ABSTRACT

Eyeglasses include a frame, and two lenses; the frame has a streamline shape, and a relatively large curvature as compared with the lenses, and has a joining portion protruding downwards from a middle portion thereof, and grooves extending from two sides of the joining portion to an upper portion of an inward side thereof; each of the lenses includes a body, and a connecting plate, which is secured on the body, and has the same curvature as the body of the lens; the lenses are firmly joined to the frame with the connecting plates being inserted in respective ones of the grooves of the frame.

1 Claim, 10 Drawing Sheets

EYEGLASSES STRUCTURE

BACKGROUND OF THE INVENTION

1. Field of the invention

The present invention relates to a kind of eyeglasses structure, more particularly one, which includes lenses, and a frame having a streamline shape, larger curvature than the lenses, and grooves; the lenses each have a connecting plate secured thereon, and are joined to the frame with the connecting plates being inserted in the grooves of the frame.

2. Brief Description of the Prior Art

People usually wear eyeglasses to correct their vision errors caused by nearsightedness, farsightedness etc, and wear sunglasses to protect the eyes from the sun's glare, which also can be used as a personal adornment. People will also wear safety glasses/sport and leisure glasses to protect their eyes when they are engaged in certain activities. And, sunglasses and sport glasses usually have a streamline and fancy shape and a relatively large curvature to make the wearers' faces more attractive.

However, it is relatively difficult for sight-assisting eyeglasses such as those for shortsighted persons to have a streamline shape and large curvature because the lenses of such sight-assisting eyeglasses will have a wrong focal distance, and be unable to produce the proper sight-assisting effect if they are formed with a large curvature in order to be capable of being joined to the above-mentioned curved frames.

SUMMARY OF THE INVENTION

It is a main object of the present invention to provide an improvement on eyeglasses structure to overcome the above problems.

Eyeglasses according to an embodiment of the present invention include a frame, and two lenses. The frame has a streamline shape, and a relatively large curvature as compared with the lenses, and has a joining portion protruding downwards from a middle portion thereof, and grooves extending from two sides of the joining portion to an upper portion of an inward side thereof. Each of the lenses includes a body, and a connecting plate, which is secured on the body, and has the same curvature as the body of the lens. The lenses are firmly joined to the frame with the connecting plates being inserted in respective ones of the grooves of the frame.

Therefore, not only can the present structure be applied to sunglasses, it can be applied to sight-assisting eyeglasses as well. Consequently, sight-assisting eyeglasses can have a streamline and fancy shape like sunglasses to be attractive.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
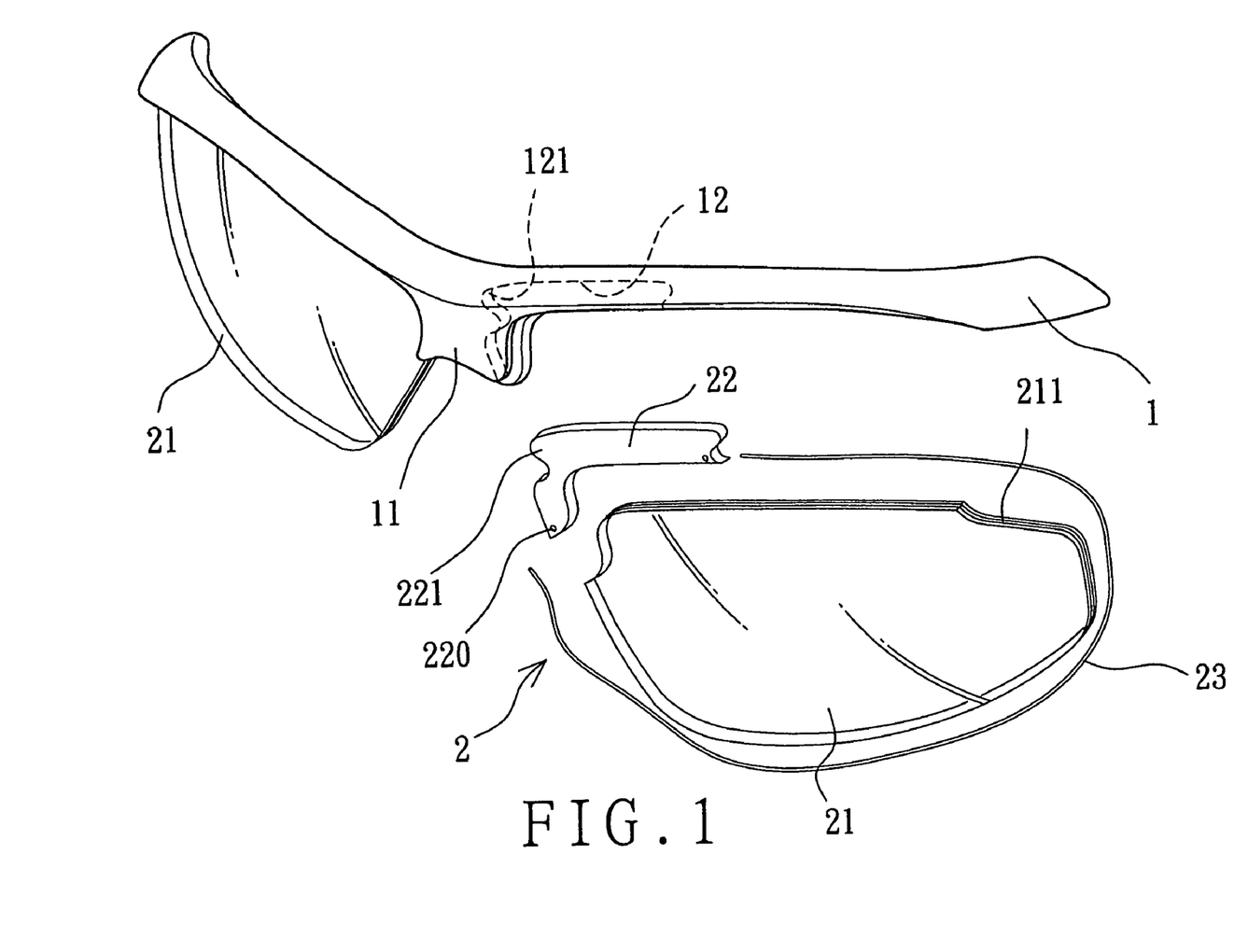
FIG. 1 is an exploded perspective view of the present invention.
Figure 2:
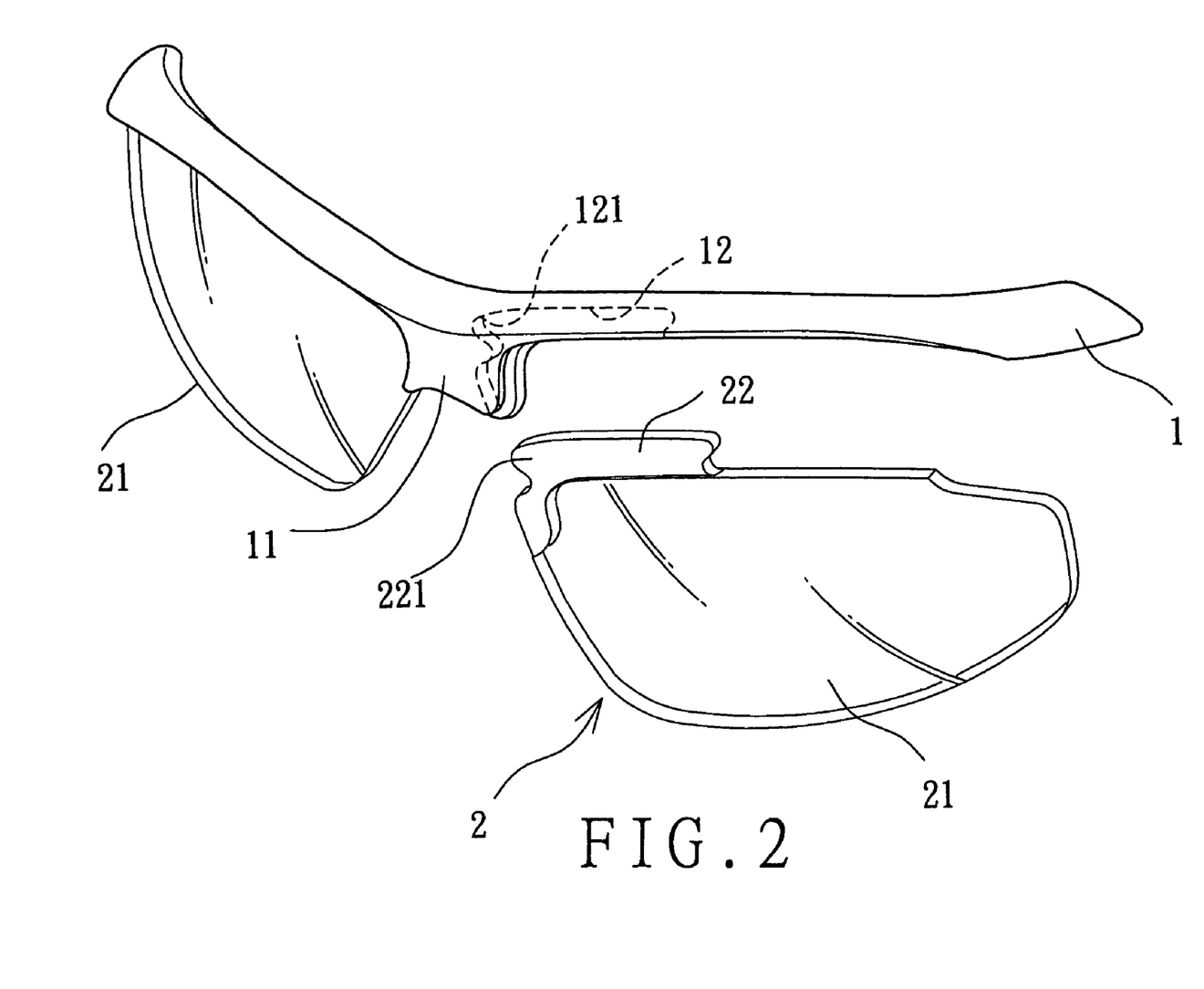
FIG. 2 is another exploded perspective view of the invention.

Referring to FIGS. 1 and 2, a first preferred embodiment of eyeglasses structure of the present invention includes a frame 1, and a lens 2. The lens 2 includes a body 21, and a connecting plate 22, which is securely joined to the lens body 21, and which has the same curvature as the lens body 21. A coupling mechanism is interposed between the connecting plate 22 of the lens 2 and the frame 1 so as to join the connecting plate 22 on the frame 1.

The frame 1 has a streamline shape, and a great curvature. The frame 1 has a joining portion 11 protruding downwards from a middle portion thereof, and has grooves 12 extending from two sides of the joining portion 11 to an upper portion of an inward side thereof; the grooves 12 have relatively a large breadth. Furthermore, the grooves 12 of the frame 1 have detainment ditches 121 thereon.

Figure 3:
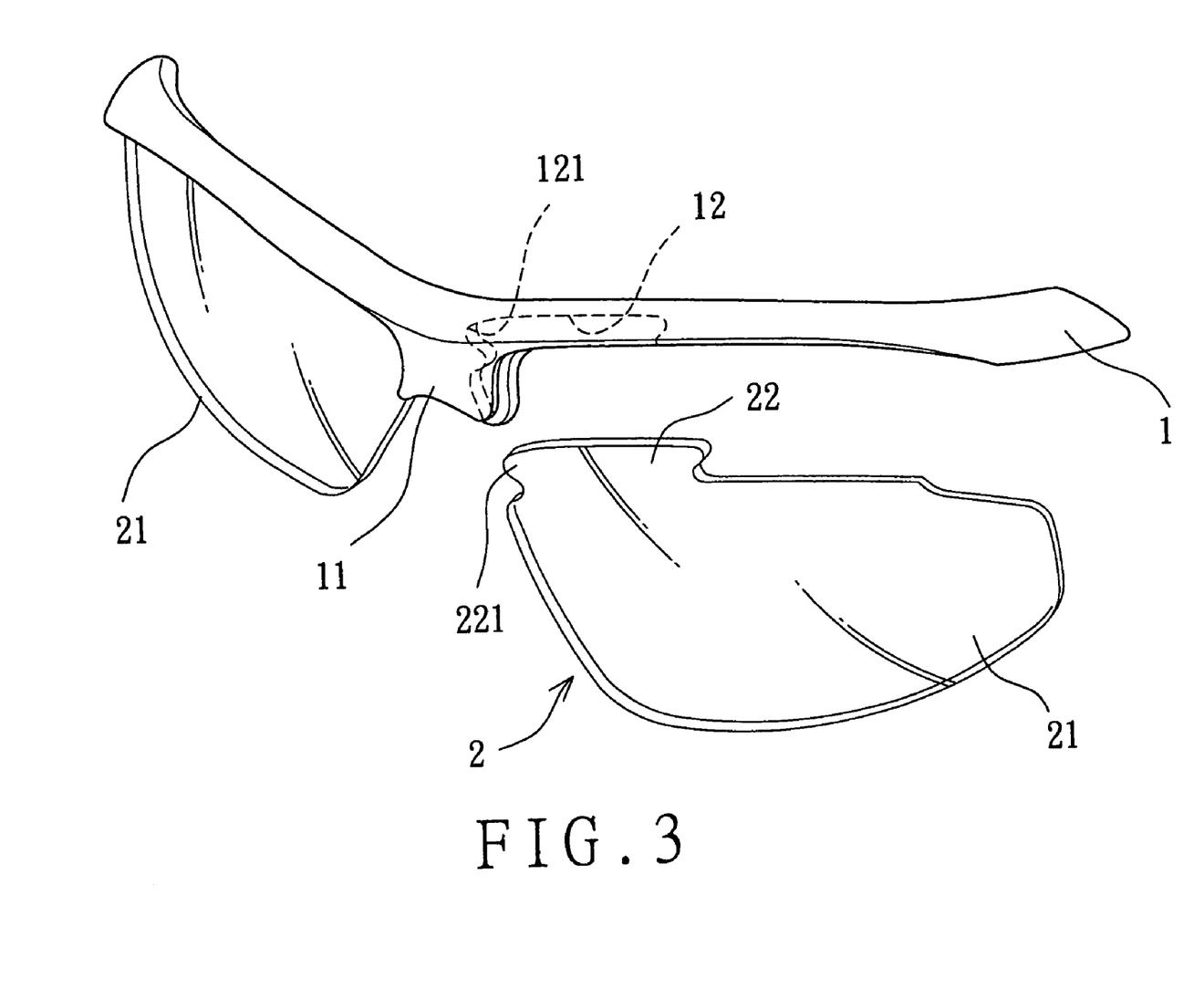
FIG. 3 is an exploded perspective view of the present invention with another form of lenses.

The lens 2 can be a piece of darkened glass/plastic to protect the eyes from the sun's glare or a lens to assist the sight. The lens body 21 has a groove 211 on a circumferential side thereof while the connecting plate 22 has a through hole 220 on each of two end portions thereof; the connecting plate 22 is securely joined on the lens body 21 by means of a string 23, which is held in the groove 211 of the lens body 21, and passed through the through holes 220 and joined to the connecting plate 22. As shown in FIG. 3, connecting plate 22 can be formed together with the lens body 21 to be an inseparable portion of the lens 2 without using such a string; such a lens structure is preferably applied to sunglasses.

Figure 4:
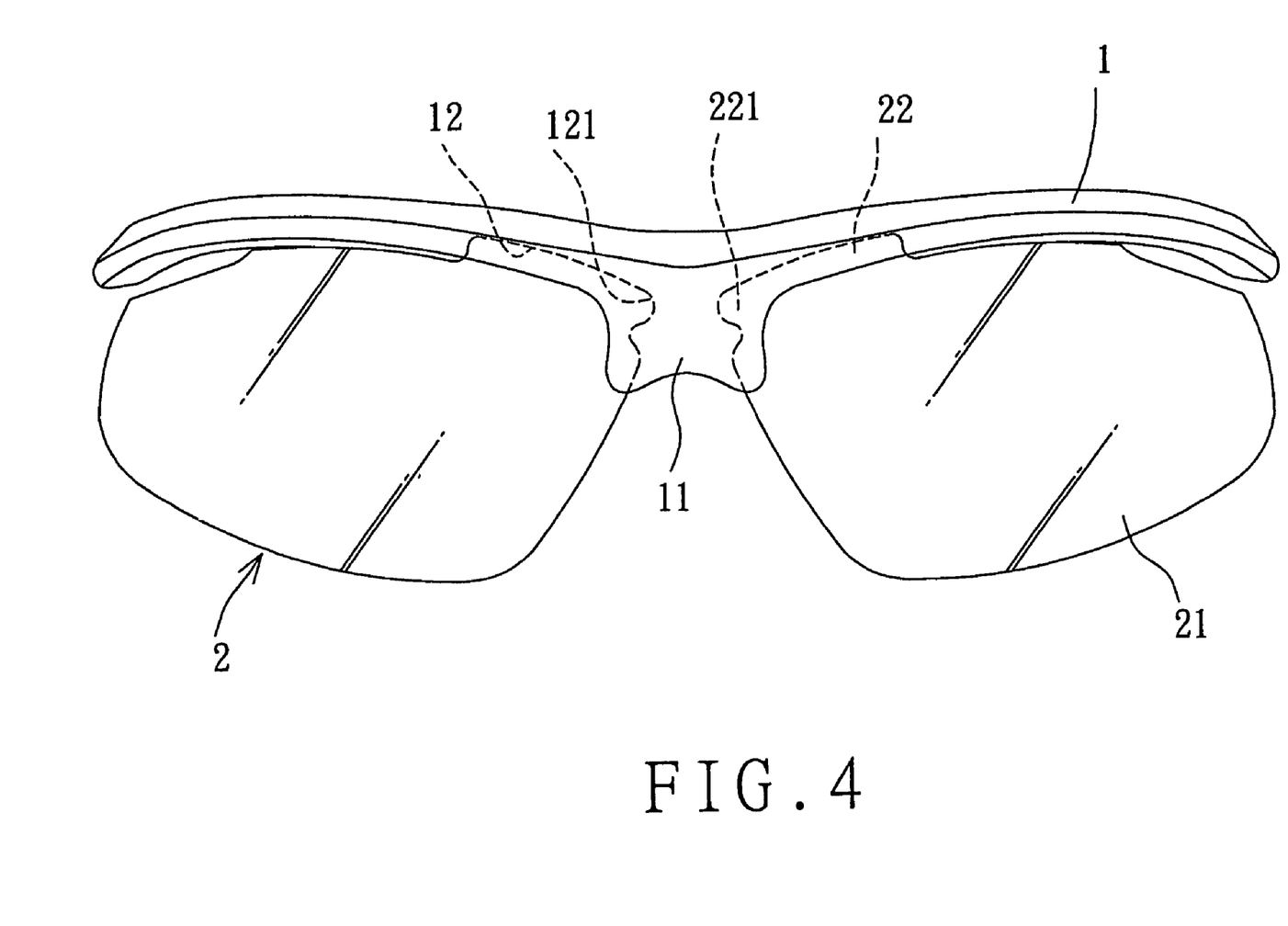
FIG. 4 is a front view of the present invention.

Furthermore, the connecting plate 22 has a detainment protrusions 221; the detainment protrusions 221 of the connecting plate 22 and the detainment ditches 121 of the frame 1 comprise the coupling mechanism; the connecting plate 22 is joined within one of the grooves 12 of the frame 1 with the detainment protrusions 221 thereof being firmly held in the corresponding detainment ditches 121 so that the lens 2 is fixed to the frame 1, as shown in Fig 4. In assembly, referring to FIGS. 2, 3 and 4, the connecting plate 22 of the lens 2 is inserted in one of the grooves 12 of the frame 2 with the detainment protrusions 221 being tightly captured in the corresponding detainment ditches 121; thus, the lens 2 is firmly joined to the frame 1.

Figure 5:
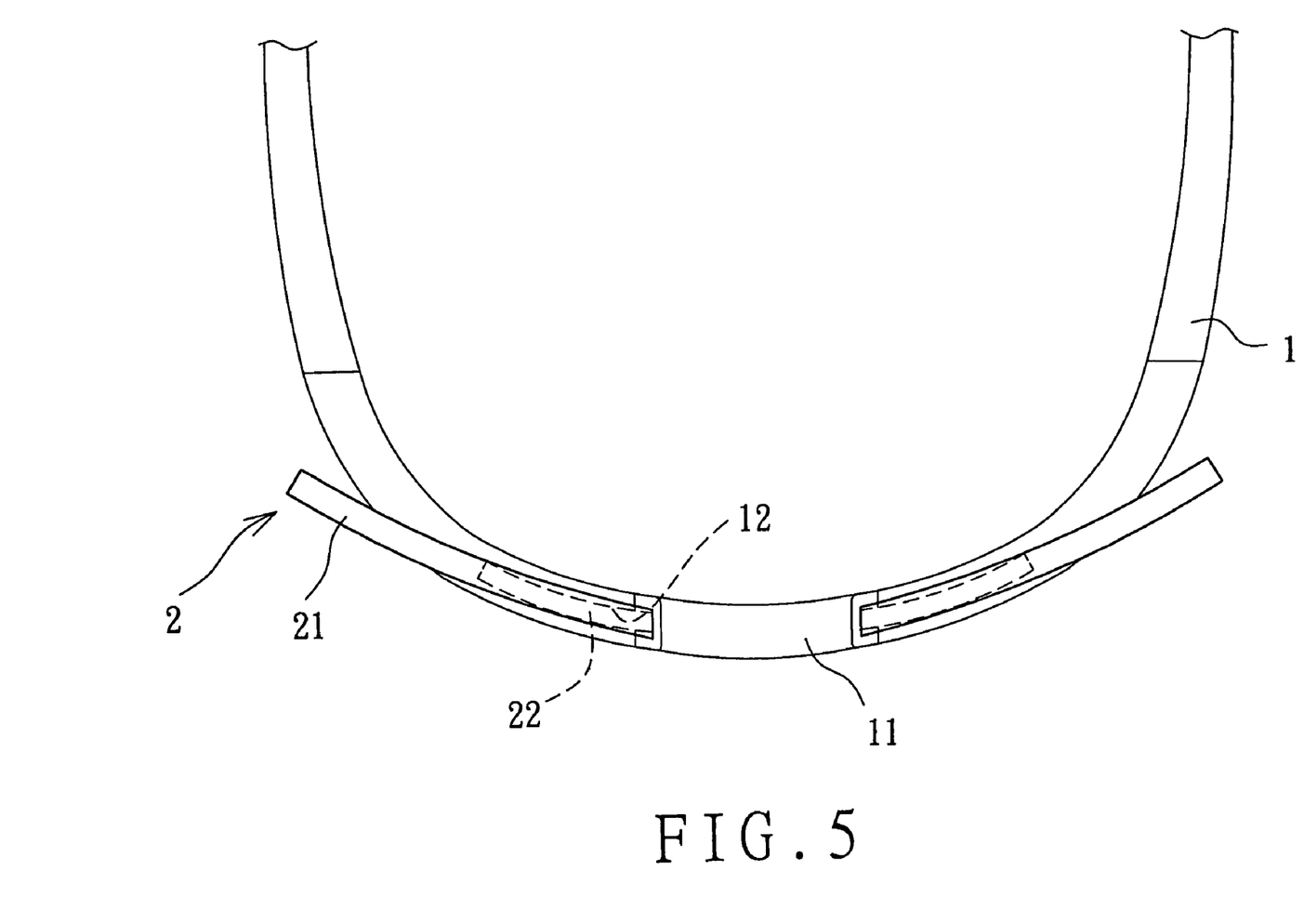
FIG. 5 is an upward view of the present invention.
Figure 6:
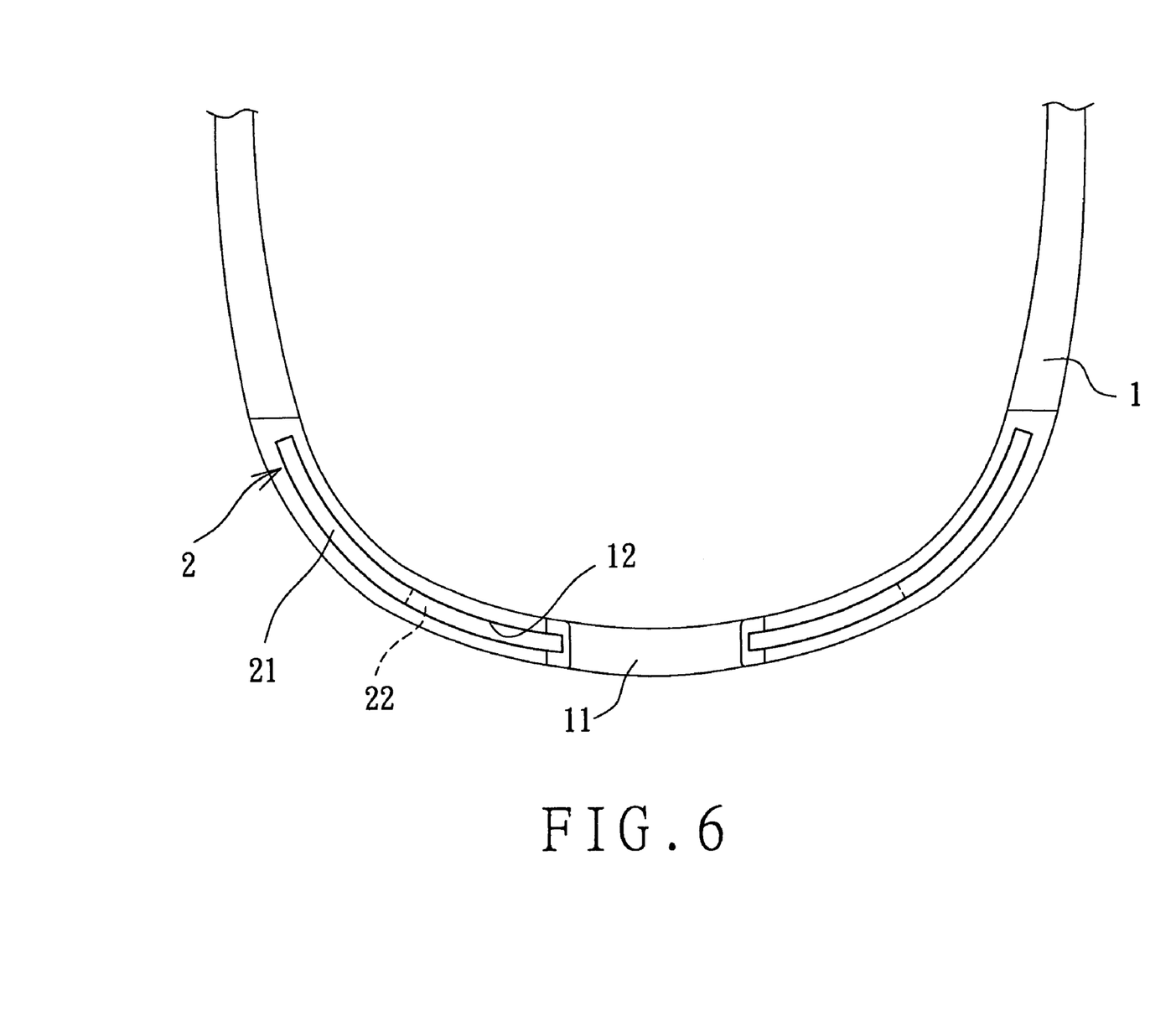
FIG. 6 is an upward view of the present invention with another form of lens.

Furthermore, referring to FIGS. 5 and 6, the grooves 12 of the frame 1 have a relatively large breadth so that the connecting plate 22, which has a relatively small curvature like the lens body 21 as compared with the lenses of sunglasses, can be inserted in the groove 12 to come into contact with an inner side of the frame 1 that defines the groove 12. Therefore, not only can the present structure be applied to sunglasses, as shown in FIG. 6, it can be applied to sight-assisting glasses as well, as shown in FIG.5. In other words, sight-assisting glasses can have a streamlined and fancy shape like sunglasses, even if the lenses of sight-assisting glasses have a relatively small curvature as compared with the lenses of sunglasses.

Figure 7:
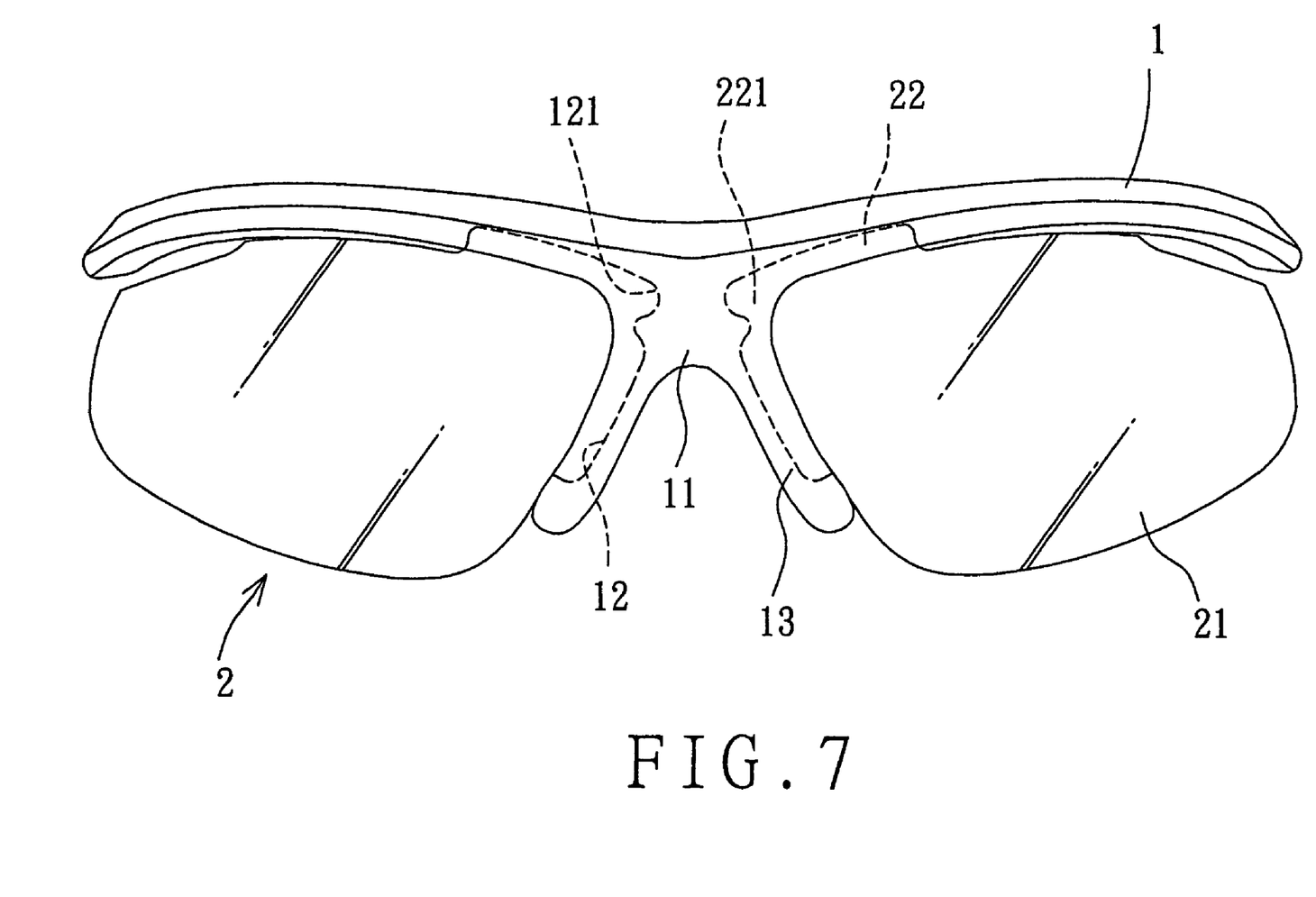
FIG. 7 is a front view of a second preferred embodiment.

Shown in FIG. 7 is the second preferred embodiment of eyeglasses structure in the present invention, wherein the frame 1 further has two nose pad portions 13, which protrude downwards from two sides of the joining portion 11 respectively, and the grooves 12 of the frame 1 each extend onto one of the nose pad portions 13; the connecting plate 22 of the lens 2 is joined on one of the grooves 12 of the frame 1 so as to join the lens 2 to the corresponding nose pad portion 13 and the joining portion 11 of the frame 1.

Figure 8:
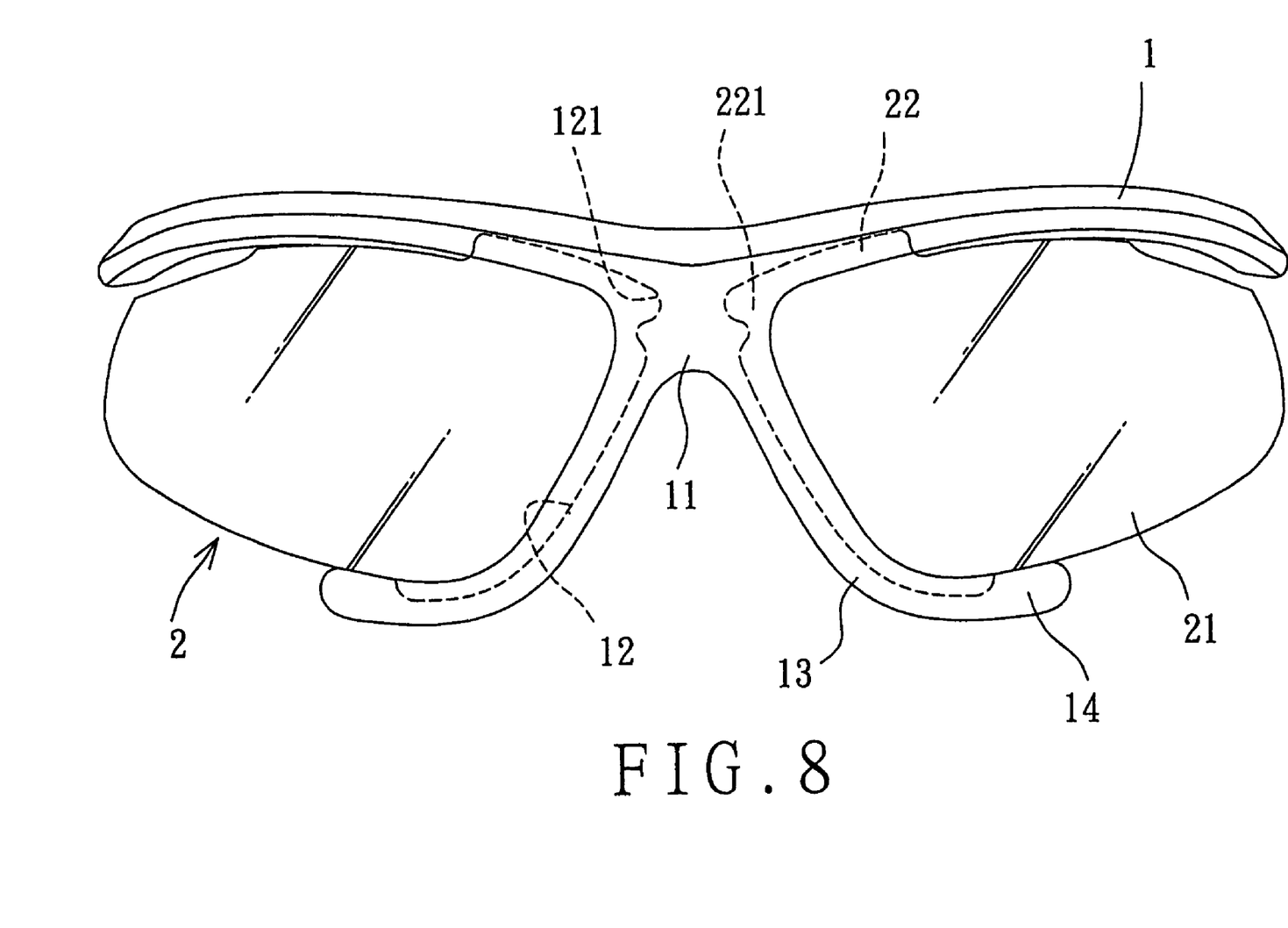
FIG. 8 is a front view of a third preferred embodiment.

Shown in FIG. 8 is the third preferred embodiment of eyeglasses structure in the present invention, wherein the frame 1 further has two bottom portions 14, which protrude downwards from the nose pad portions 13 respectively, and then protrude sideways; the grooves 12 of the frame 1 each extend onto one of the bottom portions 14; the connecting plate 22 of the lens 2 is joined on one of the grooves 12 of the frame so as to join the lens 2 to the joining portion 11, and the corresponding nose pad portion 13 and bottom portion 14 of the frame 1.

Figure 9:
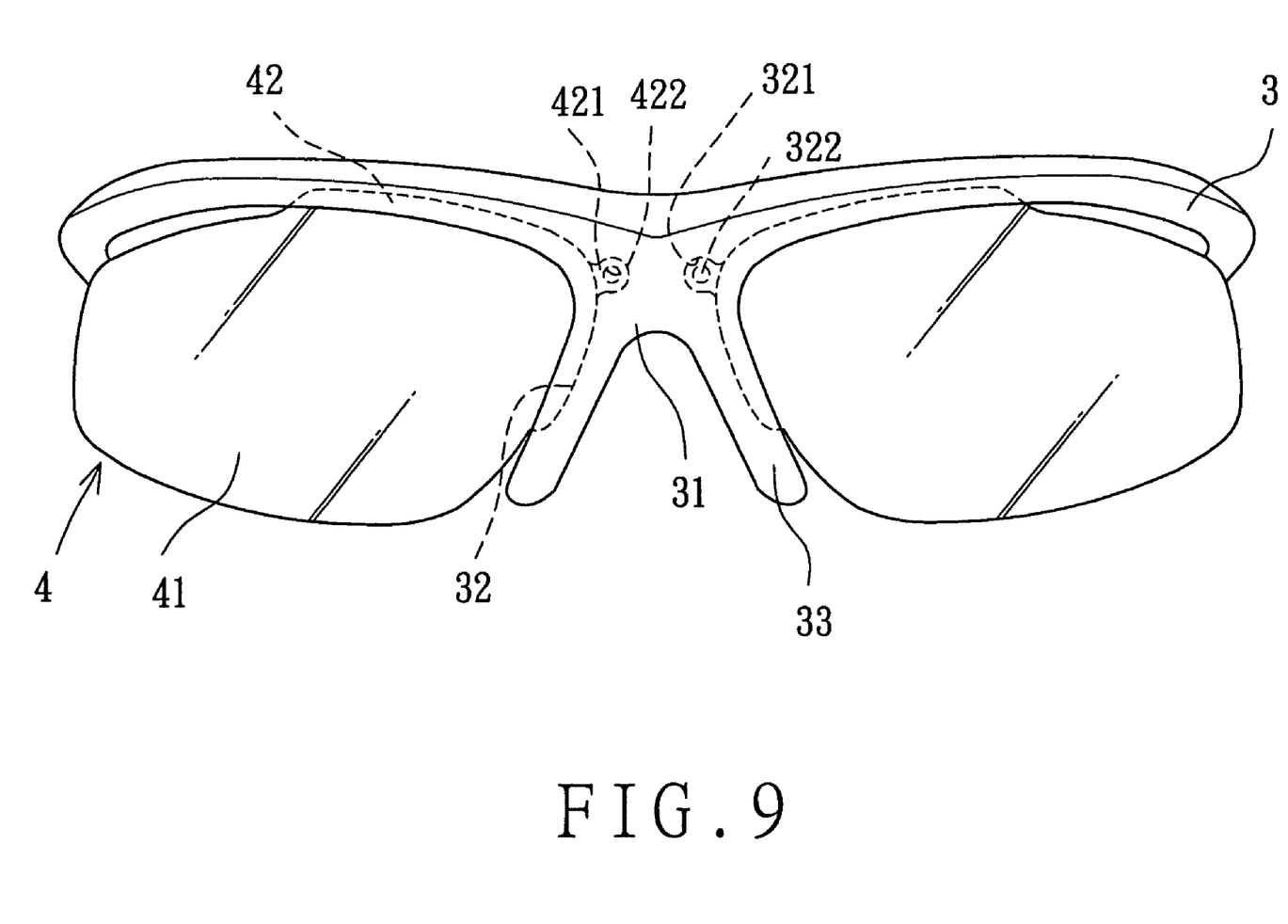
FIG. 9 is a front view of a fourth preferred embodiment.

Shown in FIG. 9 is the fourth preferred embodiment of eyeglasses structure in the present invention, wherein the grooves 32 of the frame 3 each have a cavity 321 therein, and the frame 3 has a through hole 322 extending through each of the cavities 321 while the connecting plate 42 of the lens 4 has a protrusion 421 thereon, which has a connecting (screw) hole 422; the connecting plate 42 is joined on one of the grooves 32 of the frame 3 with the protrusion 421 being held in a corresponding said cavity 321, and with a fixing element (screw) being passed through a corresponding said through hole 322 of the frame 3 and the connecting hole 422 so as to fix the lens 4 to the frame 3.

Furthermore, the frame 3 has two nose pad portions 33, which protrude downwards from two sides of the joining portion 31 respectively, and the grooves 32 of the frame 3 each extend onto one of the nose pad portions 33; the connecting plate 42 of the lens 4 is joined on one of the grooves 32 of the frame 3 so as to join the lens 4 to the corresponding nose pad portion 33 and joining portion 31 of the frame 3.

Figure 10:
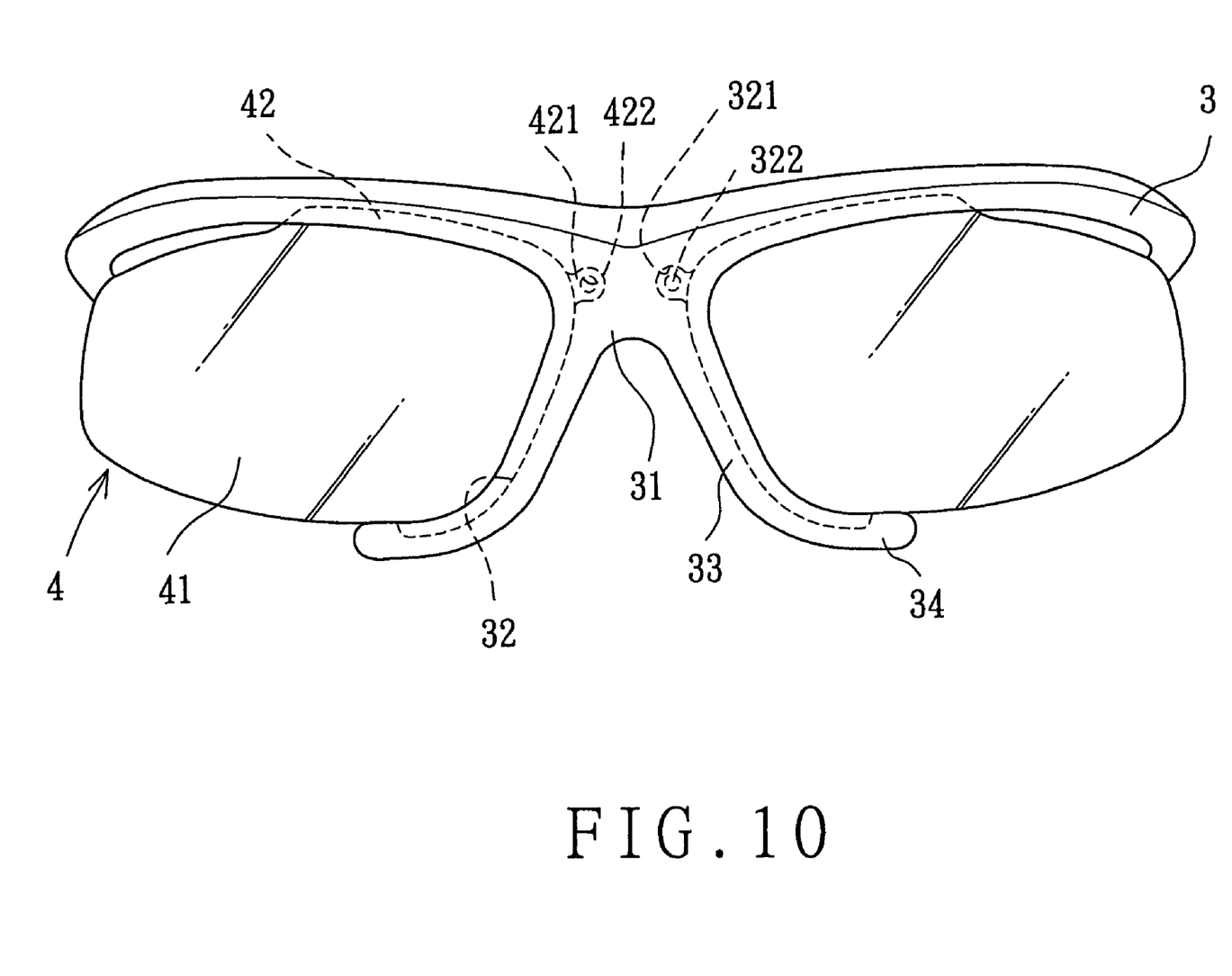
FIG. 10 is a front view of a fifth preferred embodiment.

Shown in FIG. 10 is a fifth preferred embodiment of eyeglasses structure in the present invention, wherein the frame 3 further has two bottom portions 34, which protrude downwards from the nose pad portions 33 respectively, and then protrude sideways; the grooves 32 of the frame 3 each extend onto one of the bottom portions 34; the connecting plate 42 of the lens 4 is joined on one of the grooves 32 so as to join the lens 4 to the joining portion 31, and the corresponding nose pad portion 33 and bottom portion 34 of the frame 3.

From the above description, it can be seen that the present invention has the following advantages:

1. The grooves of the frame have a relatively large breadth as compared with the connecting plate of the lens so that the connecting plate can be inserted in one said groove to come into contact with an inner side of the frame. Therefore, not only can the present structure be applied to sunglasses, it can be applied to sight-assisting eyeglasses as well. Consequently, sight-assisting eyeglasses can have a streamline and fancy shape like sunglasses to be more attractive.

2. There are several different forms of eyeglasses frames in the present invention, e.g. the frame with the middle joining portion, the frame with the middle joining portion and the nose pad portions, and the frame with the middle joining portion, and the bottom portions as well as the nose pad portions, to provide the consumers with more choices.

3. The structure of the present invention allows the lenses and the frames of eyeglasses to be easily replaced, thus providing the users with convenience.

What is claimed is:

1. Eyeglasses structure, comprising a frame, the frame having a joining portion protruding downwards from a middle portion thereof, the frame having grooves respectively extending downwardly on two sides of the joining portion and extending orthogonally in an upper portion of an inward side of the frame, each groove having a pair of oppositely facing recesses formed therein, the frame having two nose pad portions integrally formed thereon, the nose pad portions protruding downwards from two sides of the joining portion respectively, the frame further having two bottom portions integrally formed and extending downwardly from the respective nose pad portions and extending sidewardly, the grooves of the frame each having a portion extending downwardly into a corresponding one of the nose pad portions, and a further portion extending in one of the bottom portions; and a pair of lenses removably coupled to the frame, each lens including a body and a connecting plate secured on the lens body on a portion of at least an upper edge thereof, the connecting plate having a same curvature as the portion of the lens body to which it is connected, the connecting plate having a pair of protrusions formed thereon, the connecting plates of the lenses each extending on a side edge thereof for insertion into the groove portion of a corresponding nose pad portion, the connecting plates of the lenses extending from the side edge to a bottom edge thereof for insertion into the further groove portion of a corresponding bottom portion of the frame, and the protrusions being respectively forcibly insertable into a captured position within the corresponding recesses of a respective groove to secure the lens to the frame.

* * * * *